United States Patent [19]

Urban

[11] 4,349,959
[45] Sep. 21, 1982

[54] APPARATUS FOR ALIGNING BATTERY PLATES AND SEPARATORS

[75] Inventor: Todd A. Urban, Fleetwood, Pa.
[73] Assignee: General Battery Corporation, Reading, Pa.
[21] Appl. No.: 140,250
[22] Filed: Apr. 14, 1980
[51] Int. Cl.³ .......................................... B23P 19/00
[52] U.S. Cl. .................................... 29/730; 29/468; 15/310; 164/333; 164/DIG. 1; 269/34; 269/43; 269/152; 269/238; 269/90
[58] Field of Search .................. 29/730, 623.1, 466, 29/468, 271, 743; 15/303, 310; 269/21, 34, 43, 152, 238, 903; 164/DIG. 1, 333

[56] References Cited

U.S. PATENT DOCUMENTS

| | | | |
|---|---|---|---|
| 1,545,051 | 7/1925 | Hazelett | 164/DIG. 1 |
| 2,066,449 | 1/1937 | Barrett | 53/218 |
| 2,539,318 | 1/1951 | Orsino | 29/730 |
| 2,727,287 | 12/1955 | Lund | 164/DIG. 1 |
| 3,052,968 | 9/1962 | Kerns | 29/730 |
| 3,216,043 | 11/1965 | Lipson | 15/310 |
| 3,565,162 | 2/1971 | Farmer | 164/337 |
| 3,598,006 | 8/1971 | Gerber et al. | 269/21 |
| 3,816,898 | 6/1974 | Odman | 29/730 |
| 4,016,638 | 4/1977 | Klein | 29/730 |
| 4,169,223 | 9/1979 | Alvarez | 29/730 |

OTHER PUBLICATIONS

"Operation and Maintenance Manual for the Farmer Cast-On Strap Machine" from a manual published by General Battery Corporation, Reading, Pa., Manual No. 170-02-0, May, 1978.

*Primary Examiner*—Daniel C. Crane
*Attorney, Agent, or Firm*—Benasutti Associates, Ltd.

[57] ABSTRACT

A basket loader apparatus for a machine to cast commoning straps onto the positive and negative plate lugs of plate stacks used to form a multi-celled lead acid storage battery. As configured the apparatus is designed to hold a basket which contains said stacks and hold it during the casting operations. Prior to the start of said operation, the apparatus is further adapted to properly align the lugs for casting and further to enter the plates and the plastic separation which lie between them within the basket. The apparatus further includes vertical adjustment means so that plates of different size may be accommodated and vacuum cleaning means to remove fragments of lead sulfate paste and other foreign materials which might interfere with proper alignment of the plates within the basket.

22 Claims, 4 Drawing Figures

APPARATUS FOR ALIGNING BATTERY PLATES AND SEPARATORS

BACKGROUND OF THE INVENTION

This invention relates to an apparatus used with equipment for assembling a stack of alternating positive and negative plates which together form a cell for use in multi-celled lead acid storage batteries as generally employed for automotive, industrial and commercial applications.

The construction of a lead acid storage battery is generally accomplished by the series assembly of a plurality of discrete cells formed within a battery case, each cell having a nominal voltage, when charged, of about 2.0 volts. Each cell is constructed by combining a plurality of alternately arranged rectangular, relatively thin positive and negative plates to form a stack. As fabricated, each of the plates is in the form of a grid having a plurality of cavities filled with a "paste" of lead oxide and sufuric acid. Each plate also has an upstanding commoning lug and the plates are disposed so that all of the positive plate lugs lie along one side of the stack and all of the negative plate lugs lie along its opposite side. The stack is finished by inserting insulating separators between the plates to prevent the positive and negative plates from shorting out after the subsequent charging step and then casting a lead commoning strap onto the lugs.

In the production of battery plates, as in the production of most high-volume, massed produced items, there is a tolerance level within which the plates must be produced in order to be acceptable. However, within this tolerance, it is possible that there is a substantial variability both among the plates used within any given stack to form a cell and between the plurality of stacks which are assembled to form a battery. In the production of the battery, it would be highly advantageous if this variability could be accommodated and operated on in a single cycle of the production equipment used. This is especially critical at the processing stage where the positive lugs and the negative lugs within the cell have the lead commoning strap cast onto them prior to the placement of the inner-cell connectors which, when connected, act to form the series assembled battery.

One apparatus widely used for accomplishing the task of commoning the battery lugs within each stack is the Farmer Cast-On-Strap (COS) Machine. The Farmer Machine is adapted to produce, in a single cycle, a plurality of final assembled stack sufficient to make up one battery. The strap casting operation is done within the COS apparatus by holding the stacks with a rectangular, multi-celled device commonly referred to as a basket, while the straps are cast onto the lugs.

The basket itself is loaded on the COS Machine while being held on a fixture known as a basket loader. This is designed so that it fits more or less down the lengthwise centerline of each basket while leaving a pair of lengthwise spaces running one on either side of the underside of the basket so that the plate stacks may be inserted into a kit in either a lugs up or lugs down configuration, depending on the particular mode of operation within the COS Machine. The device provided with the Farmer Machine to do this is relatively simple and comprises basically nothing more than a long tang onto which the basket is slidably mounted and clamped during the loading operation. Where the plates are roughly the full width of the basket, there is no problem in using such a device since the sidewalls of the basket will align the plates with sufficient precision so that the positive and negative lugs are essentially lined up within the tolerance levels required for the strap casting operation. However, where the plates used are substantially narrower than the full width of the basket, it is quite possible either the plates or separators within each stack will be assembled so that they are not exactly lined up with each other or that the stack itself will be misaligned for the casting operation.

A second problem with these machines is the fragility of the lead sulfate paste. With any degree of rough handling, fragments of it will break free which, if not removed interfer with the close fit of the plates and separators within the basket prior to the casting.

With the fixturing available for the Farmer Machine, there is no easy way to correct these problems and it is usually necessary for the machine operator to manually push the separators and plates together so that they properly fit together and the lugs all line up within a given stack and then finally to make sure the stacks are all properly aligned within the basket space. From a production point of view, this is not a satisfactory situation since it slows down the operating speed of the system. Furthermore, since the Farmer Machine operates with a pot of molten lead nearby, the necessity for the operator to work so close to the machine creates a considerable safety hazard as well. It would be highly desirable if it were possible for the plate and stack alignment to be done automatically so that it would not be necessary for the operator to do anything more than simply insert the stack assemblies into the basket. The subject invention is adapted to accomplish this.

BRIEF DESCRIPTION OF INVENTION

The subject invention is adapted to fit on a COS apparatus such as a Farmer Cast-On-Strap Machine. As disclosed, it is a loader platform onto which a basket is slideably mounted and clamped. The basket itself is a multi-celled device adapted to contain the proper number of multiple plate stacks used to form a battery prior to the lug commoning operation. As noted above, each plate within a stack has an upstanding lug, disposed so that all of the positive plate lugs are on one side of the stack and all of the negative plate lugs are on the other side of the stack. The stack itself is placed within the basket so that all of the lugs are either in an upright or downwardly disposed position. While precise correspondence of the plates and spacers within the stack is not important when the plates are inserted, it is important that they be properly aligned before the casting operation itself begins.

In the subject invention, this alignment is performed by operation of the loader. To do this, there are disposed on either side of the loader on the outward side of the basket adjacent to each of the respective cells within it, two sets of movable alignment means, which in use, are driven towards the centerline of the basket/loader combination in the COS Apparatus.

On the first or upper set there is in an inwardly disposed array of canted wipers which, in the preferred embodiment are presented at approximately a 45 degree angle and fabricated from a resilient material such as neoprene. These act to center the insulating separators between the plates and it is important that this be done before the commoning strap casting operation is completed. If this is not done the plates are usually clamped so tightly together that movement of the insulator is next to impossible without damaging the stack.

The second or lower set of alignment means acts directly on the base portion of each plate in a stack to center it within the basket, so that the casting operation can be conducted in a proper manner. In its preferred embodiment, the basket loader conducts both of the centering operations simultaneously.

The apparatus as configured performs yet another operation. It contains vacuum means adapted to remove loose fragments of lead sulfate "paste" from the plates or other loose material which have fallen out of the basket onto the loader surface. It has been found if these fragments are not expeditiously removed before the centering and casting operations are begun, they can interfer with proper insulator and plate centering and thus, lead to a defective product.

It is therefore the primary object of this invention to provide a apparatus for use in a Farmer COS or similar machine to center a plurality of stacks within a basket prior to the lug commoning strap casting operations.

It is another object of the present invention to provide an apparatus for centering the plates used to form each stack.

It is still another object of the present invention to provide an apparatus for centering the insulating separators within each stack.

It is yet a further object of the present invention to provide an apparatus for removing lead sulfate fragments which have broken off from said plates prior to said casting operation.

Other and further objects of the present invention will become apparent from a consideration of the following more detailed description taken along with the enclosed figures.

DETAILED DESCRIPTION OF INVENTION

Figure 1:
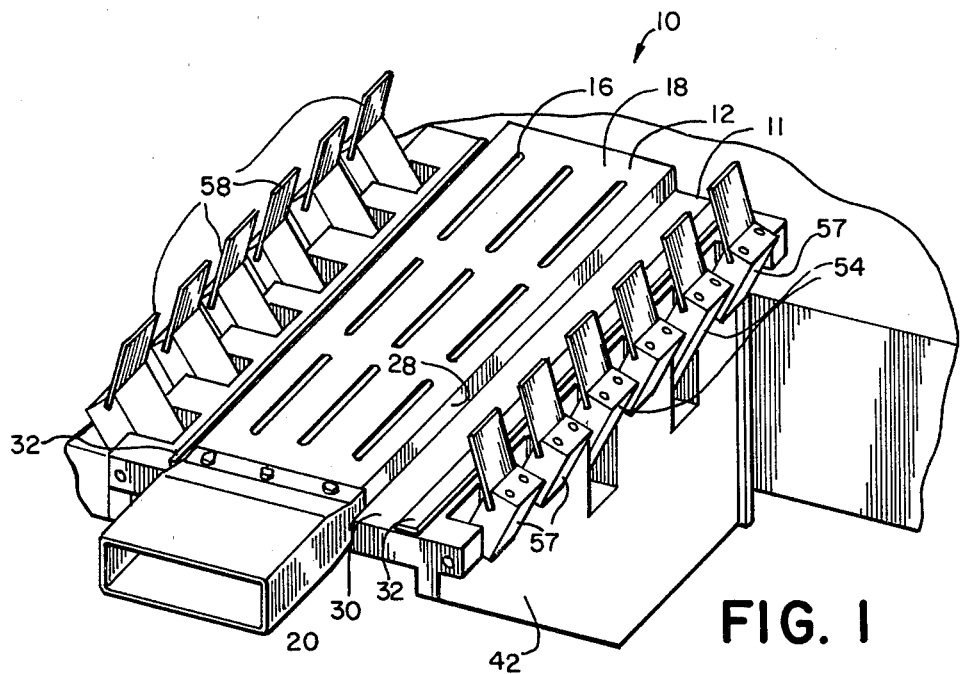
FIG. 1 is an isometric drawing of a basket loader according to the subject invention.
Figure 2:
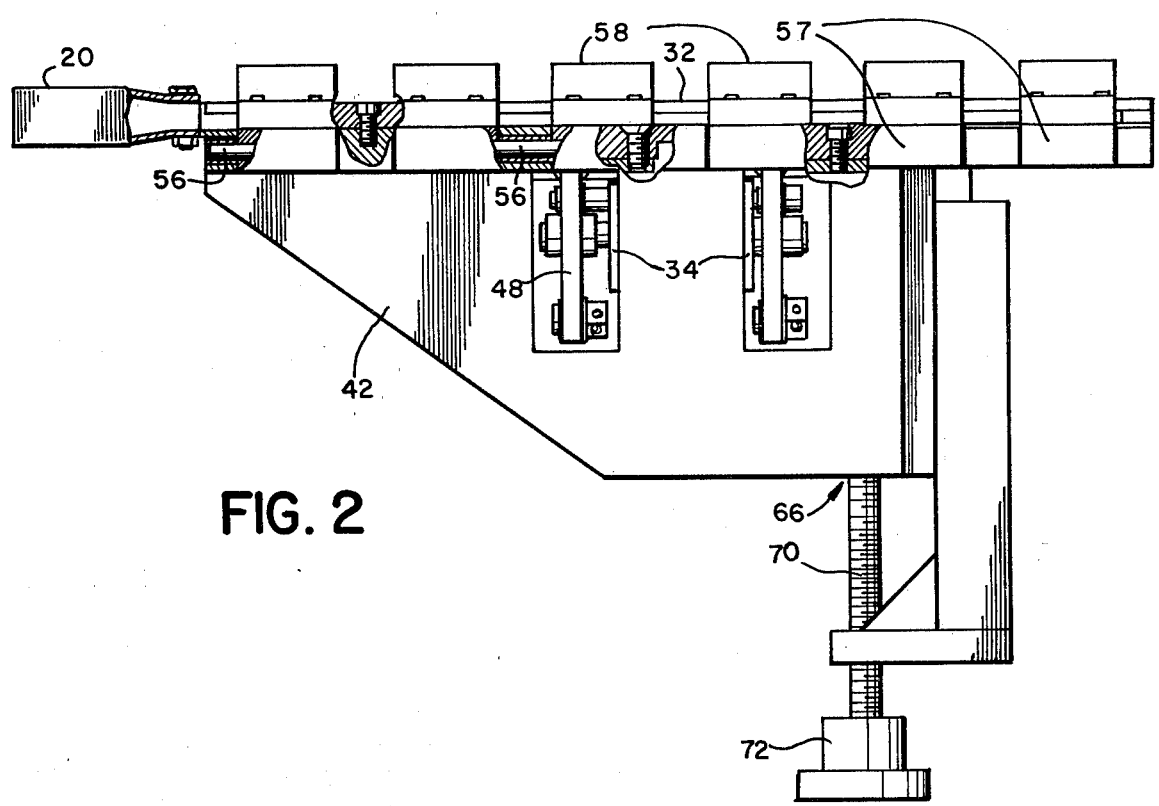
FIG. 2 is a side view of the loader shown in FIG. 1.
Figure 3:
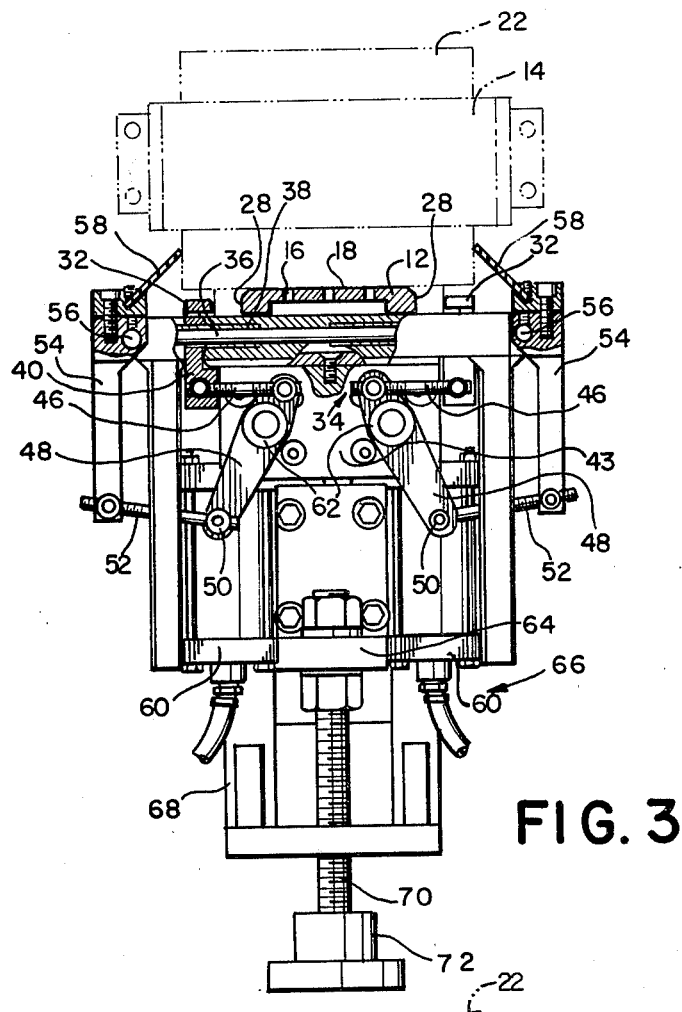
FIG. 3 is a cross-section end view of a basket loader in the closed position along line 3—3 in FIG. 2.
Figure 4:
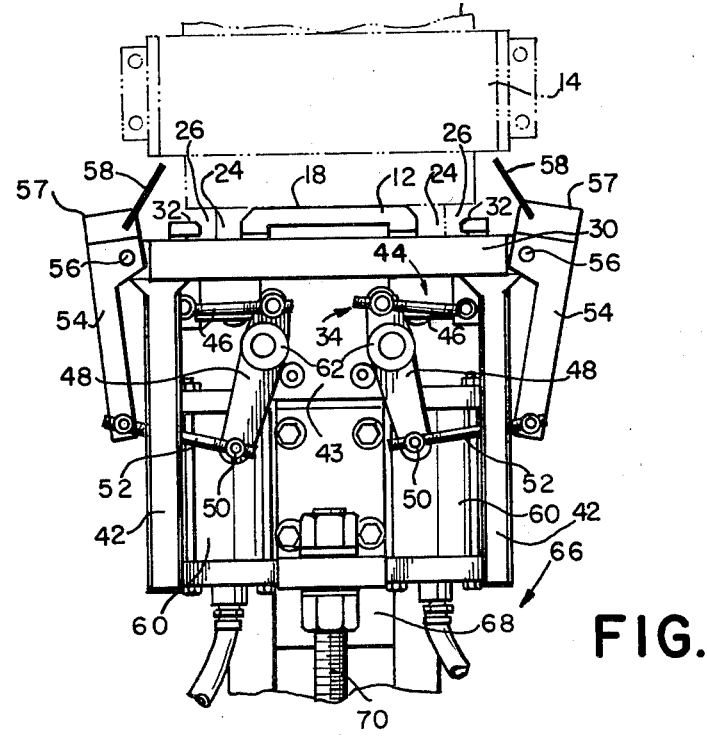
FIG. 4 is similar to FIG. 3 but showing the loader before activation.

Looking now at FIGS. 1 to 4, we see several views of a basket loader 10 as described herein, said loader being adapted, for purposes of illustration, to fit onto a Farmer COS Machine and further adapted to accept a basket of the types used on such a machine during a lug commoning strap casting operation. As shown it comprises an open bottomed box-like frame 11 on the top of which is mounted a top alignment exhaust plate 12 running lengthwise from front to rear onto which an open bottomed rectangular basket 14 can be slideably mated. Plate 12 is basically in the form of an elongated flattened U-shaped member having a relatively broad flat base and short relatively straight sides disposed so as to form an inverted channel closed at its outboard end. As shown, member 12 has a plurality of vent slots 16 machined through its base surface 18 and terminates at its forward inboard end in an exhaust mount 20, the purpose of which will be explained herein below. As shown in FIGS. 3 and 4 base surface 18 is configured so that it forms a landing on which basket 14 rests when it is in position to be loaded.

In the fabrication of a battery, the plates which are to be commoned are usually assembled by layering positive plates, separators and negative plates until the requisite number is reached to form a loose stack. After assembling, the stacks are put into the individual cavities of basket 14. Since the plates and insulators are loosely coupled, they are not necessarily aligned one with another, or with the basket itself for the subsequent casting operation. In order for the operation to proceed properly it is necessary that they be so aligned. It is this alignment operation which will be described in connection with the subject apparatus.

Basket 14 is adapted to accept and clamp a plurality of battery plate stacks 22. Each of plates 22 has an upstanding lug 24 which is disposed so that all of the positive plate lugs in a given stack lie along one side and all of the negative plate lugs lie along the opposite side of the stack when it is assembled prior to insertion into the basket for the commoning strap casting operation. The Farmer Machine itself is adapted so that this operation can be conducted with the plates situated in either a "lugs up" or "lugs down" position depending on the particular machine accessories used. For purposes of illustration however, the balance of this discussion will be conducted with stacks of plates in the "lugs down" position.

The Farmer Machine is also adapted to process plates for a variety of battery sizes. Depending on battery application and capacity, these plates will differ in width, height and thickness. Consequently, both loader 10 and basket 14 have to be of such size that they can easily accommodate and process all of them. As a result, basket 14 is somewhat wider than plate 12 and the stack holding cells therein are substantially longer than the normal range of stack thicknesses encountered. To handle plate height variability the loader itself incorporates adjustment means adapted to raise and lower base surface 18. When processing in the lugs down position, however, height adjustment is much less of a problem.

Returning to the examination of FIGS. 1 to 4, it will be seen that when the basket is placed on base surface 18, the lugs 24 drop down along side said base into one of a pair of lug guides 26. Each of guides 26 is formed from one of sides 28 of alignment plate 12 as its inner side, the top surface 30 of frame 11 as its bottom and one of a pair of recriprocally movable alignment bars 32 as its outer side, said guides being disposed so that they run lengthwise down the entire length of frame 11.

Looking now in particular at FIGS. 3 and 4, we see that both of alignment bars 32 are coupled to a set of articulated activators 34 which act to cause both of the bars to move in and out across the base of lug guides 26, thus, alternately widening and narrowing them. In the outer or open position guide 26 is sufficiently wide so that all of the downwardly disposed plate lugs 24 protruding from the base of basket 14 will easily fit into them regardless of their sidewise orientation. However, when the actuators cause alignment bars 32 to close, that is to move inwardly across top surface 30 towards sides 28 they will eventually contact the lugs push the plates inwardly as well. Both bars are actuated simultaneously and move in mirror image motions relative to each other so they push both misaligned positive and negative plates inwardly with them to the point where they are all centered within the basket and all of the downwardly pointing lugs are perfectly aligned on both the left and right sides of a stack. Such a situation is shown in FIG. 3.

Referring further to FIGS. 3 and 4, we can see in detail the construction of the articulated actuation system 34. In the system disclosed herein, the basket is adapted to hold a plurality (usually 6) of stacks of battery plates. The combined weights of the lead grids and the lead sulfate paste which form the finished plates puts a considerable load on the actuators. As a result, as shown in FIG. 2, it will require a fairly husky system to move the alignment bars. In the preferred embodiment this problem is handled by splitting the load into at least two articulated systems 34 acting as a mutually coupled set, one set to each side of frame 11. By so doing, relatively light weight components can be used. Furthermore, since all the articulation systems are constructed alike, the discussion describing their structure and action will be limited to one on the left side of frame 11 with the understanding that the remarks made for it apply equally to all. However, it must be remembered that all of motions in the right side are reversed in direction as compared to these on the left side of frame 11.

As shown in FIGS. 3 and 4, alignment bar 32 is connected to a shaft 36 which is contained within top plate 30 and which runs across its width from the left to the right side of the loader. Supporting the shaft and allowing it to slideably move from left to right within the confines of the frame structure are a pair of bushing seals 38, shown most clearly in FIG. 3. The alignment bar itself is clamped onto the outer end of shaft 36 and in addition forms the upper part of a linear rod mount 40. This extends through the top of frame into an internal space within frame 11 defined by the two sides 42 of frame 11 and cylinder mounting plate 43 which extends vertically between said sides. Rotatably attached to the lower end of rod mount 40 is a coupling mechanism 44 which connects the rod mount via an adjusting screw 46 to the upper end of double acting crank 48.

Crank 48 is the driving means for all of the alignment motions described herein. Thus, when it rotates clockwise coupling mechanism 44 acts to pull alignment bar 32 inwardly to perform the plate pushing operation described hereinabove. Counterclockwise operation of crank 48 moves it outwardly to open up lug guide 26 so that lugs 24 may be inserted therein.

Connected to the lower end of crank 48 is a pivot pin 50 which in turn is connected by an adjustable pivot arm 52 to the lower end of pivot block crank 54. Pivot block crank 54 itself is rotatably attached at its upper end to the outer edge of top surface 30 through a pivot shaft 56 and the articulationestablished is such that when the lower end of crank 48 rotates clockwise inwardly so does pivot crank 54. Attached to the upper side of pivot block crank 54 is a plurality of alignment blocks 57 onto each one of which is mounted an angularly disposed resilient push bar 58 preferably made out of a flexible material such as neoprene. Each of push bars 58 is of sufficient width and set in at an angle (usually 45 degrees) to the top of pivot block crank 54 so that when actuated and caused to rotate inwardly it will bear against all of the insulators and center them within a stack. Thus both the lug and separation centering operations are performed simultaneously with one movement of crank 48.

This movement is established by the operation of in cylinder 60 which, as shown is mounted on cylinder mounting plate 43 and is rotatably coupled to collar 62, the center of rotation of crank 48. This coupling is adapted to perform the clockwise and counterclockwise crank motions described hereinabove which act to cause the lug and separator centering operations.

Also, as noted herein above, plate loader 10 must be adapted to handle a wide variety of plates. Consequently, in addition to accommodating a basket sufficiently wide to hold plates of the maximum width, it must also be adaptable to handle sets of stacks having different heights. To do this, the loader incorporates adjustment means for raising and lowering it. This comprises a loader mounting plate 64 to which elevation means 66 is attached. In the present preferred configuration, this is simply a slide plate 68 which is coupled through a threaded rotatable rod 70 attached to said loader mounting plate. At the lower end of the threaded rod is a handle 72 adapted to manually turn said rod and cause the top surface of loader 10 to rise up or drop down according to the height of the stacks being handled at the time. As previously noted, processing the plates in the lugs down condition greatly reduces this particular problem.

The individual plates used in each stack are formed from a lead grid having a plurality of regular open spaces into which a lead sulfate "paste" made from a mixture of lead oxide and sulfuric acid is pressed to form the finished plate. After drying this paste is somewhat fragile and pieces of it may break off during the normal handling operations related to assembling the plates to form a stack and then loading the stack into basket 14. In the latter case should these fragments not be removed, they can interfer with the free and full movement of the plates and separators within a stack and thus prevent them from being aligned properly prior to the casting operation. When this happens an imperfectly formed finished stack is produced. This will always require some rework and/or, in extreme cases, scrapping. To prevent this from happening, it is necessary that these fragments prior be removed prior to stack compression.

It was noted herein above that plate 12 is "basically an elongated, flatened U-shaped member, having a relatively broad, flat base and short, relatively straight sides disposed to form an inverted channel closed at its rear end. As shown member 12 has a plurality of vent slots 16 machined through its base surface 18 and terminates at its forward end in an exhaust mount 20". It was further noted that this inverted "U" is set onto the top surface 30 of frame to form the landing surface for basket 14. In so doing, it forms a rectangularly shaped, elongated hollow tube running from the front to the rear of loader 10, closed at its rear end and terminating through exhaust mount 20 in an attached vacuum line 74. This acts to create a negative pressure within the tube so that any loose paste fragments or bits of other foreign material are vacuum cleaned through the vents into the interior of the tube and then out of the work area, thus promoting production of acceptable finished stacks.

It will be understood that various changes in the details, materials and arrangement of parts which have been herein described and illustrated in order to explain the nature of this invention may be made by those skilled in the art within the scope and principle of the invention as shown in the following claims.

What I claim is:

1. An apparatus adapted to mate with an open-bottomed, rectangular basket used to hold a plurality of stacks which form the cells of a multi-celled lead acid storage battery, each of said stacks being formed by layering a plurality of alternating positive and negative plates with insulating separators between them, each of said plates having an upstanding commoning lug, said plates being disposed within said stacks so that all of the positive plate lugs lie along one side and all of the negative plate lugs lie along an opposite side and further, each of said plates being formed from a lead grid having a plurality of regular open spaces, said spaces being filled with a dried lead sulfate paste made from a mixture of lead oxide and sulfuric acid, said basket acting to clamp said stacks within a plurality of internal cavities and further adapted to cooperate with a machine adapted to cast a commoning lead strap onto said lugs, said apparatus comprising:

a. an open box-like frame having a top and sides, said frame further comprising mounting means adapted to support said basket while said stacks are being loaded therein, said mounting means further comprising a lengthwise disposed, inverted, flat-based, substantially U-shaped member disposed to form a rectangular tubular channel with the top of said frame, said member further cooperating with said frame to form a pair of lengthwise oriented lug guides, said member being sufficiently narrow relative to said basket so that when said basket is mounted on said flat base member and said stacks are inserted into said cavities in a lugs down position, said lugs will extend into said guides;

b. first alignment means cooperating with said basket to center said separators within said stack prior to said casting operation; and c. second alignment means adapted to cooperate with said basket to center said plates within said basket prior to said casting operation, said alignment means further comprising a pair of alignment bars disposed along the length of the top of said frame on either side thereof and disposed on either side of said mounting means so as to form an outer side of said lug guides; and d. articulation means attached to said frame and coupled with said first and second alignment means so that it activates their respective centering operations;

e. said articulation means cooperating with said bars to reciprocally move in and out across said lug guides so that when moved to the outer position, said guides are wide enough that said lugs will fit into them regardless of their sidewise orientation within said basket and all of said positive and negative plate lugs are aligned one with another along the sides of said stacks.

2. The apparatus of claim 1 wherein said first alignment means comprises a set of pivotally mounted crank arms running lengthwise along the outer sides of said frame, said arms having attached thereto a plurality of angularly mounted resilient push bars, said first alignment means cooperating with said articulation means to rotate inwardly whereby said push bars contact said separators and center them relative to the plates within each stack.

3. The apparatus of claim 2 wherein said articulation means comprises actuation means operably attached to rotatable double-acting crank means, said crank means being disposed so that its lower end is coupled to said first alignment means and at its upper end it is pivotally connected to said second alignment means said actuation means adapted to impart rotational motion to said crank wherein said motion causing said first and second alignment means to simultaneously first move outward relative to said basket so that said stacks can be inserted into said basket and said lugs can fit into said lug guides, and then to move simultaneously inward relative to said basket so that said lugs are aligned and said separators are centered.

4. The apparatus of claim 3 wherein said mounting means further comprises a seal at the outer end of said tubular channel, a plurality of vent slots in said flat base and an exhaust vent at the inter end of said tubular channel, said vent being connected to a vacuum line so a negative pressure is established within said tubular channel thus, creating a vacuum within said channel whereby any loose fragments of foreign material which might interfere with the free and full motion of said plates within said stack are vacuum cleaned through the vents into the tube and then out of the work area.

5. The apparatus of claim 4 further comprising elevation means adapted to raise and lower said apparatus so that battery stacks having different heights may be readily accommodated.

6. An apparatus for aligning battery plates and separators into stacks for use in an electric storage battery said apparatus comprising:

a. a frame;

b. a base surface disposed on said frame, said base surface dimensioned to receive a plurality of battery plates and separators;

c. first alignment means pivotally mounted to said frame and disposed on opposite sides of said base surface;

d. drive means for urging said first alignment means toward said base surface wherein said first alignment means will contact said plurality of battery plates and separators and align same;

e. second alignment means, said second alignment means extending above said frame, said second alignment means being located between said first alignment means and said base surface for moving across said base surface;

f. drive means for moving said second alignment means across said base to contact a different location on said plates from said first mentioned contact in order to additionally align same.

7. The apparatus of claim 6 whereby said base surface further comprises:

a plate member having dependent side walls for disposing said plate member in a space relationship from said frame, said plate members having a plurality of apertures therein, whereby debris from said base surface will fall through said apertures.

8. The apparatus of claim 7 wherein said base surface further comprises:

a vacuum source for creating a vacuum in the said space between said plate members and said frame, whereby debris is drawn off.

9. The apparatus of claim 7 wherein the upper surface of said plate member is separated from said frame by a distance of at least equal to the height of the lug on said battery plate whereby said battery plate will rest on said plate member and said lug will be disposed adjacent side wall.

10. The apparatus of claim 9 wherein:

said alignment means and said first second alignment means are urged toward said plate member by a common drive means.

11. The apparatus of claim 10 wherein said base surface further comprises:

a vacuum source for creating a vacuum in the said space between said plate member and said frame, whereby debris is drawn off.

12. The apparatus of claims 10 or 11 wherein said frame is mounted for vertical adjustment.

13. An apparatus for aligning battery plates and separators into stacks, each of said battery plates having at least one lug thereon, said apparatus comprising:
   a. a frame;
   b. a base surface disposed on said frame, said base further comprising a plate member having dependent side walls for spacing said plate member from said frame, said plate member being spaced from said frame by a distance at least equal to the height of said battery plate lugs;
   c. first alignment means pivotally mounted to said frame and disposed on opposite sides of said base surface for aligning said battery plates and separators;
   d. second alignment means extending above said frame on opposite sides of said plate member, said second alignment means being located between said first alignment means and said plate member for further aligning said battery plates; and
   e. common drive means coupled to said first and second alignment means for urging same toward said plate member.

14. The apparatus of claim 13 wherein said plate member has a plurality of apertures therein.

15. An apparatus for aligning a plurality of separators and battery plates into stacks, each of said battery plates having at least one lug thereon, said apparatus comprising a frame:
   a. a base surface disposed on said frame and spaced from said frame by a distance substantially equal to the height of said lug;
   b. alignment means pivotally mounted on said frame and disposed on opposite sides of said base surface for aligning said battery plates and separators;
   c. lug alignment means disposed on opposite sides of said base surface and movable toward said base surface to center said plate lugs;
   d. first drive means coupled to and for urging said alignment means toward said base surface to align said battery plates and separators;
   e. second drive means coupled to and for moving said lug alignment means toward said base surface.

16. The apparatus of claim 15 wherein said first drive means and said second drive means are a common drive means.

17. An apparatus for aligning separators and battery plates into stacks, said battery plates having at least one lug thereon, said apparatus comprising:
   a. a frame;
   b. a base disposed on said frame and spaced therefrom by a distance at least equal to the height of said lug, said base having a width less than the width of said battery plates;
   c. separator alignment means pivotally mounted to said frame and disposed on opposite sides of said base;
   d. drive means coupled to and for urging said separator alignment means toward said base surface to center said insulating separator with respect to said battery plate;
   e. lug alignment means disposed between said separator alignment means and said base and movable toward said base; and
   f. drive means coupled to and for moving said lug alignment means toward said base surface for centering said lugs.

18. The apparatus of claim 7 wherein said frame is mounted for vertical adjustment.

19. The apparatus of claim 17 wherein said separator alignment means further comprises a plurality of alignment blocks.

20. The apparatus of claim 19 wherein each of said alignment blocks further comprises a flexible member mounted thereon.

21. The apparatus of claim 19 wherein said plurality of alignment blocks is equal in number to twice the number of stacks, said alignment blocks being divided equally on opposite sides of said base surface, all of said alignment blocks on a respective side being mounted on a common shaft.

22. An apparatus adapted to mate with a basket used to hold a plurality of stacks which form the cells of a multicelled battery, each of said stacks being formed by layering a plurality of plates with insulating separators between them, each of said plates having an upstanding commoning lug, said basket further adapted to cooperate with a machine adapted to cast a commoning lead strap onto said lugs, said apparatus comprising:
   a. a frame, said frame further comprising mounting means adapted to support said basket while said stacks are being loaded therein, said mounting means further comprising an inverted, generally U-shaped member disposed to form a channel with said frame to form a pair of lengthwise oriented lug guides, said member being sufficiently narrow relative to said basket so that when said basket is mounted thereon, said lugs will extend into said guides;
   b. first alignment means cooperating with said basket to center said separators within said stack prior to said casting operation;
   c. second alignment means cooperating with said basket to center said plates within said base prior to said casting operation, said alignment means further comprising a pair of alignment bars disposed on either side of said frame so as to form an outer side of said lug guides,;
   d. articulation means coupled with said first and second alignment means so that it activates their centering operations,
   e. said coupled articulation means causing said bars to reciprocally move in and out across said lug guides for further aligning said lugs.

* * * * *